United States Patent
Joos et al.

(10) Patent No.: US 6,748,927 B2
(45) Date of Patent: Jun. 15, 2004

(54) METHOD, COMPUTER PROGRAMME AND CONTROL AND/OR REGULATION DEVICE FOR OPERATING AN INTERNAL COMBUSTION ENGINE

(75) Inventors: Klaus Joos, Walheim (DE); Jens Wolber, Gerlingen (DE); Thomas Frenz, Noerdlingen (DE); Markus Amler, Leonberg (DE); Hansjoerg Bochum, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 10/110,384

(22) PCT Filed: Jul. 21, 2001

(86) PCT No.: PCT/DE01/02784

§ 371 (c)(1),
(2), (4) Date: Jul. 26, 2002

(87) PCT Pub. No.: WO02/14669

PCT Pub. Date: Feb. 21, 2002

(65) Prior Publication Data

US 2003/0010324 A1 Jan. 16, 2003

(51) Int. Cl.$^7$ .............................................. F02D 41/30
(52) U.S. Cl. ....................... 123/478; 701/104; 701/115
(58) Field of Search ................................ 123/436, 478, 123/494, 350, 457, 456; 701/104, 115, 110

(56) References Cited

U.S. PATENT DOCUMENTS

| | | | | |
|---|---|---|---|---|
| 4,085,709 A | | 4/1978 | Tangri | 123/1 A |
| 5,035,223 A | | 7/1991 | Watanabe | 123/459 |
| 5,222,481 A | | 6/1993 | Morikawa | 123/435 |
| 5,881,694 A | * | 3/1999 | Nakada | 123/305 |
| 6,125,823 A | * | 10/2000 | Thomas | 123/464 |
| 6,223,843 B1 | | 5/2001 | O'Connell et al. | 180/65.3 |
| 6,285,946 B1 | * | 9/2001 | Steinmann | 701/110 |
| 6,386,180 B1 | * | 5/2002 | Gerhardt et al. | 123/350 |
| 6,512,983 B1 | * | 1/2003 | Bauer et al. | 702/41 |
| 6,516,782 B1 | * | 2/2003 | Thomas | 123/436 |
| 6,529,815 B2 | * | 3/2003 | Hawkins et al. | 701/104 |
| 2001/0026777 A1 | | 10/2001 | Negishi et al. | 422/112 |
| 2003/0204302 A1 | * | 10/2003 | Amano | 701/102 |

FOREIGN PATENT DOCUMENTS

| | | | |
|---|---|---|---|
| DE | 196 12 150 | 10/1997 | |
| DE | 197 27 765 | 1/1998 | |
| DE | 197 26 756 | 1/1999 | |
| DE | 198 52 218 | 10/1999 | |
| DE | 295 22 067 | 10/1999 | |
| DE | 100 46 597 | 3/2001 | |
| DE | 100 08 823 | 9/2001 | |
| JP | 57 171042 | 10/1982 | |
| JP | 101230 | * 6/1983 | ........... F02D/01/02 |
| JP | 2001-258105 | 9/2001 | |
| JP | 3896 | * 1/2003 | ........... F02D/41/40 |
| KR | 614712 | * 5/2003 | ........... F02D/41/04 |
| WO | WO 00/19084 | 4/2000 | |
| WO | WO 02/49131 | 6/2002 | |

OTHER PUBLICATIONS

Patent Abstracts of Japan, vol. 007, No. 012 (M–186), Jan. 19, 1983.

* cited by examiner

*Primary Examiner*—Hai Huynh
(74) *Attorney, Agent, or Firm*—Kenyon & Kenyon

(57) ABSTRACT

A method for operating an internal combustion engine, e.g., of a motor vehicle, where fuel is supplied under pressure via at least one injection valve. The injected fuel quantity is influenced by the injection time of injection valve. In order to be able to provide optimum operating comfort and good component reliability even in the event of an incorrect fuel pressure, a maximum allowable torque of the internal combustion engine that is dependent on the instantaneous fuel pressure is determined.

11 Claims, 4 Drawing Sheets

METHOD, COMPUTER PROGRAMME AND CONTROL AND/OR REGULATION DEVICE FOR OPERATING AN INTERNAL COMBUSTION ENGINE

FIELD OF THE INVENTION

The present invention relates to: a method for operating an internal combustion engine, e.g., of a motor vehicle, where the fuel is supplied under pressure via an injection valve and the injected fuel quantity is influenced by the injection time.

BACKGROUND INFORMATION

Such a method is typically used for internal combustion engines that include a throttle,valve that is not mechanically connected to the gas pedal, e.g., of a motor vehicle. It functions according to the principle of direct gasoline injection (DGI), where the fuel;is injected with high pressure directly into a combustion chamber of the internal combustion engine. The injection is performed in this context via an injection valve that is controlled by a control and/or regulating device such that it is open for a certain period of time. Therefore, in the conventional method, the fuel quantity injected into the combustion chamber is determined or influenced by the injection time.

The basis of the direct gasoline injection is a fuel system that supplies the fuel under high pressure to the injection valves. If the actual fuel pressure deviates from a setpoint pressure range due to a fault in the fuel system, this may lead to the injected fuel quantity not corresponding to the required fuel quantity despite a correct opening period of the injection valve.

For this reason, the injection period is corrected in the case of the conventional method as a function of the fuel pressure. The corrected injection period may, however, be longer than the maximum timing window available for injection. In this case, the injection is discontinued. This results in an air-fuel mixture in the combustion chamber that may not correspond to the required air-fuel mixture. Such an air-fuel mixture may be lean, for example, which may result in a break in the torque or even misfires of the internal combustion engine. Moreover, the emission characteristics of an internal combustion engine that is operated in this manner suffer.

The indicated problems occur above all in the case of high rotational speeds and a correspondingly high required fuel quantity to be injected. In the case of the conventional method, the maximum possible rotational speed of the internal combustion engine is restricted when the fuel pressure deviates from a setpoint pressure range. However, this results in a significant loss of comfort in operation of the internal combustion engine, e.g., in connection with the operation of the internal combustion engine in a motor vehicle, since a large operating range of the internal combustion engine is no longer available. Moreover, it may occur that a temperature drop needed to protect, for example, an exhaust gas turbine or a catalytic converter by appropriately enriching the mixture is no longer possible.

Therefore, it is an object of the present invention to further develop a method such that the internal combustion engine may be able to be operated at a relatively high comfort level even in the event of a fault in the fuel system, and a lifetime of the internal combustion engine and its components that is as long as possible is ensured.

This object may be achieved by determining a maximum allowable torque of the internal combustion engine that is dependent on the actual fuel pressure.

SUMMARY OF THE INVENTION

According to the present invention, in the event of a fault in the fuel system of the internal combustion engine, the engine may be operated at high rotational speeds without having to fear damage to the internal combustion engine. The cause of possible damage to the internal combustion engine in the event of a fault in the fuel system is not the high rotational speeds, but the incorrect air-fuel mixture in the combustion chamber due to the incorrect injected fuel quantity. The effects may be perceptible at a high actual rotational speed of the internal combustion engine.

By restricting the maximum torque of the internal combustion engine, it may be possible to us,e the entire speed range of the internal combustion engine. Thus, in accordance with the present invention, the internal combustion engine may be able to be operated at very high rotational speeds as long as only a small fuel quantity must be injected in this speed range. This is the case when a relatively low torque must be provided in the internal combustion engine.

In the case of a motor vehicle, such situations may be present, e.g., during a downhill run, e.g., when operating the motor vehicle with a trailer.

In a first further refinement, the maximum allowable torque may be acquired from a restriction of a maximum air charge of a combustion chamber. The air charge of the combustion chamber may be a value that is easy to set for conventional internal combustion engines. In the case of internal combustion engines where the throttle valve is not mechanically connected to a gas pedal (so-called EGAS), the air charge may be able to be simply adjusted by appropriately controlling the throttle valve. In the case of internal combustion engines having precompression (turbo charger), a recirculation valve is typically able to be actuated via which the boost pressure, i.e., ultimately the air charge of the combustion chamber, is able to be adjusted.

An object of the method is to adjust a certain fuel-air mixture in the combustion chamber even in the event of a fault in the fuel system. This may be possible, for example, in that the maximum air charge from which the maximum allowable torque is acquired is determined on the basis of the maximum injectable fuel quantity.

This may be determined from the instantaneous rotational speed, the maximum possible injection time, and the available fuel pressure. Such a determination of the maximum injectable fuel quantity may lend itself when the fault in the fuel system is due to the pressure being too low. Such a fault may occur in the case of a defective fuel pump, for example.

A pressure of the fuel system that is below a setpoint pressure range may cause the maximum injectable fuel quantity to decrease since during the opening period of the injection valve, i.e., the injection time, only a minimal fuel quantity emerges from the injection valve. The maximum injection time possible at a certain rotational speed then results from the maximum possible rotational speed of the internal combustion engine and the maximum valve-specific and/or internal combustion engine-specific injection time possible at this rotational speed (this is then generally dependent on the earliest possible injection start and the ignition firing point).

However, a fault in the fuel system may also result in a fuel pressure that is too high. This may occur, for example, when a pressure control valve in the fuel system is defective. To be able to permit the injection valve to reliably open in the case of a fuel pressure that is too high, the holding current of the injection valve must be increased. However, an increased holding current may result in a significant increase in power loss in a control unit; of the injection valves, which then results in this control unit being thermally stressed. In a further refinement of the method of the present invention, this is countered in that the maximum injectable fuel quantity may be determined from the instantaneous rotational speed, a holding current of the injection valve, and the fuel pressure.

Since restricting the maximum torque of the internal combustion engine may significantly affect the operating characteristics of the internal combustion engine, in a further refinement of the method of the present invention, a detected deviation results in an error message. In the case of a motor vehicle, such an error message informs the driver that the normal torque of the internal combustion engine is not available. As such, the drive is able to adapt his/her driving technique to the changed characteristic of the internal combustion engine.

The present invention also relates to a computer program that is suited for implementing the above method when it is performed on a computer. In this context, the computer program may be stored on a memory, e.g., on a flash memory.

Finally, the present invention also relates to a control and/or regulating device for operating an internal combustion engine, e.g., of a motor vehicle, where the fuel is supplied under pressure via at least one injection valve, and the injected fuel quantity is influenced by the injection time.

In order to be able to provide the user with the maximum comfort during operation of the internal combustion engine in the event of a deviation of the ;fuel pressure from a setpoint pressure range, in accordance with the present invention, the control and/or regulating device determine a maximum allowable torque of the internal combustion engine that is dependent on the actual fuel pressure. With regard to the control and/or regulating device of the present invention, reference is made to the explanations above.

Example embodiments of the present invention are explained in detail in the following with reference to the accompanying drawings.

DETAILED DESCRIPTION

Figure 1:
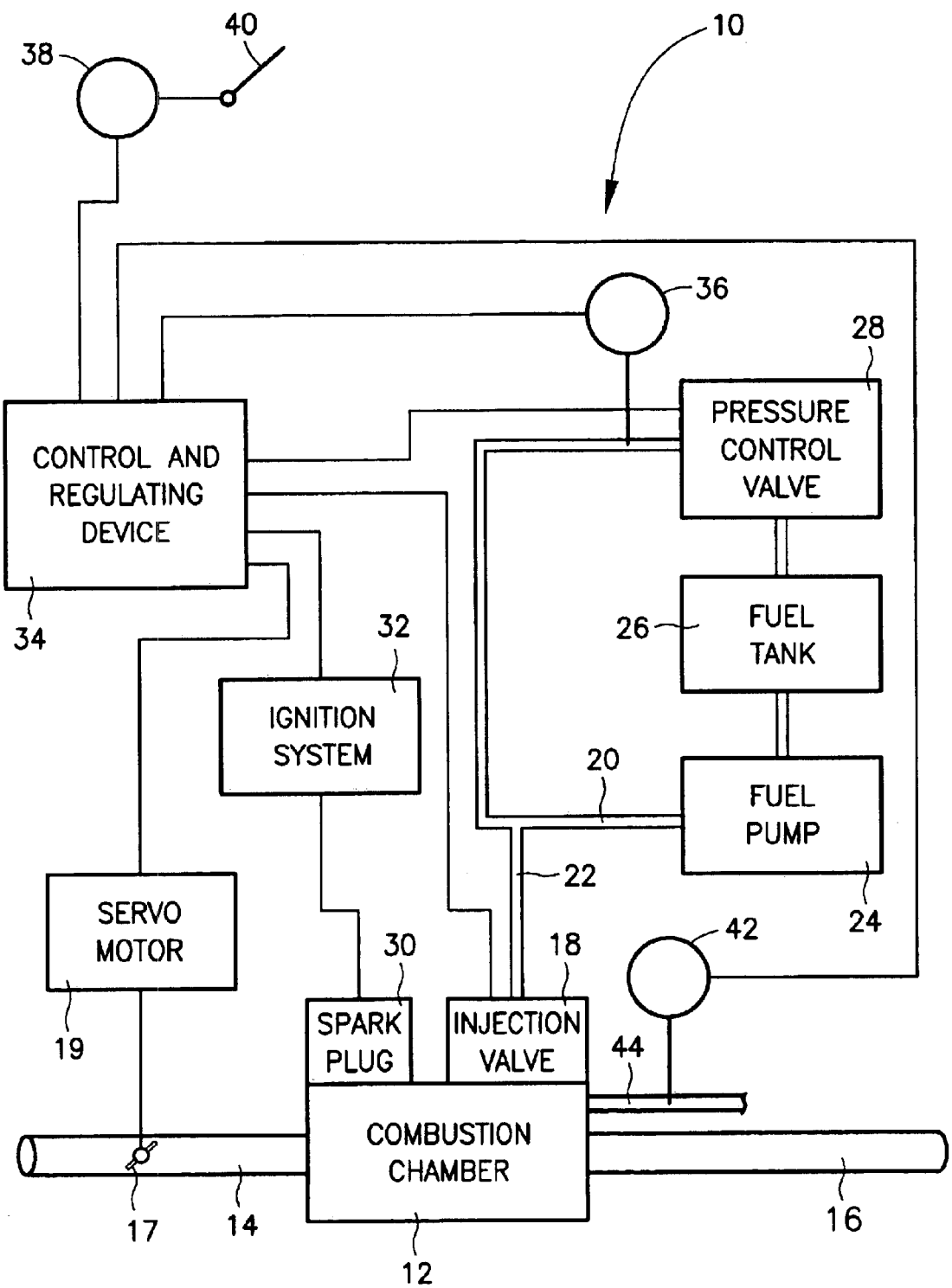
FIG. 1 illustrates a block diagram of an internal combustion engine.

In FIG. 1, an entire internal combustion engine is designated by reference numeral 10. It includes a combustion chamber 12, to which combustion air may be supplied via intake manifold 14. Exhaust gases may be discharged from combustion chamber 12 via an exhaust pipe 16. Provided in the intake manifold may be a throttle valve 17 whose angular position may be adjusted relatively to intake manifold 14 by a servomotor 19.

The fuel arrives in combustion chamber 12 via a high pressure injection valve 18, which injects the fuel directly into combustion chamber 12. Although in the case of the present example embodiment only one high pressure injection valve 18 is illustrated, it is understood that a plurality of valves may also be provided.

High pressure injection valve 18 may be fed by a fuel collection line 20 to which it may be connected via a stub line 22. Fuel collection line 20 is typically designated as "rail." The fuel in fuel collection line 20 may be under very high pressure, which may be generated by a high pressure fuel pump 24. This may then be connected on the incoming side to a fuel tank 26. To adjust the pressure in fuel collection line 20, a pressure control valve 28 may be provided that is interposed between fuel collection line 20 and fuel tank 26.

The fuel-air mixture set in combustion chamber 12 may be fired by a spark plug 30, which may be powered by an ignition system 32.

Internal combustion engine 10 also includes a control and regulating device 34, which may be first connected on the incoming side to a pressure sensor 36, which ascertains the pressure in fuel collection line 20. Therefore, pressure control valve 28, pressure sensor 36, and control and regulating device 34 form a closed control loop for the pressure in fuel collection line 20. Control and regulating device 34 also receives signals from a position sensor 38, which reads off the angular position of a gas pedal 40. Finally, control and regulating device 34 may also be connected to a speed sensor 42, which detects the rotational speed of a crankshaft 44.

On the output side, servomotor 19 of throttle valve 17, ignition system 32, high pressure injection valve 18, and pressure control valve 28 may be controlled by control and regulating device 34.

During normal operation, a performance requirement corresponding to the angular position of gas pedal 40 transmitted by position sensor 38 may be converted by control and regulating device 34 into corresponding control signals for servomotor 19 of throttle valve 17 and for high pressure injection valve 18. In the case of a pressure in fuel collection line 20 that is too low due to a defective high pressure fuel pump 24, the injection period of the high pressure injection valve may be corrected (i.e., increased). However, since the maximum injection period is limited on the one hand by the start of the intake stroke and on the other hand by the ignition firing point, there may be situations in which less fuel reaches combustion chamber 12 of internal combustion engine 10 via high pressure injection valve 18. In this case, a method may be used that is stored as a computer program on a memory of control and regulating device 34. The method may proceed as follows (see FIG. 2).

After start block 46, a maximum possible injection time timxth of high pressure injection valve 18 may be determined in a block 48. Maximum possible injection time timxth at a certain rotational speed results from a factor F (block 50) being divided by rotational speed nmot (block 52) of crankshaft 44 determined by speed sensor 42. Factor F may be determined from the maximum possible rotational speed of internal combustion engine 10 multiplied by the longest possible injection time of high pressure injection valve 18 at this maximum rotational speed.

For a conventional internal combustion engine 10, the maximum possible rotational speed is approximately 6000 revolutions/min, for example. The longest possible injection time at maximum rotational speed then corresponds in the best case to the length of the corresponding intake stroke plus a certain part of the compression stroke. At a rotational speed of 6000 revolutions/min, this is slightly more than 5 milliseconds.

In a block 54, maximum injectable fuel quantity rkmxth may be determined from maximum possible injection time timxth at instantaneous rotational speed nmot under consideration of instantaneous pressure pr in fuel collection line 20, which may be provided by pressure sensor 36. From this, corresponding maximum air charge rlmaxth may then be determined in block 56 under consideration of a desired composition of the air-fuel mixture in combustion chamber 12. The desired composition of the fuel-air mixture in combustion chamber 12 is usually represented by the lambda value (block 58).

Maximum injectable fuel quantity rkmxth and corresponding air charge rlmaxth may be fed into a characteristics map MIMXTH (block 60), whose output variable is a maximum allowable torque mimxth of internal combustion engine 10 with regard to the desired mixture composition and the maximum injectable fuel quantity (block 62). Reference is also made to the fact that at a significantly lower fuel pressure than the setpoint fuel pressure, a further torque reduction may be necessary since the mixture formation does not function properly. This may be taken into consideration by a factor dependent on the rotational speed.

Maximum allowable torque mimxth of internal combustion engine 10 may be compared to a so-called driver's desired torque mifab, which may be acquired in block 64 from the signal of position sensor 38 of gas pedal 40. In block 66, a minimum value may be formed that as the output variable in block 68 yields setpoint torque mi of internal combustion engine 10. The method ends in block 70.

If maximum allowable torque mimxth based on pressure pr in fuel collection line 20 is less than the driver's desired torque mifab, torque mimxth is output as the setpoint torque. Otherwise, the driver's desired torque mifab may be used as the setpoint torque. In this manner, it may be ensured that even in the case of a pressure pr in fuel collection line 20 that is below a setpoint pressure range, the desired composition of the air-fuel mixture is able to be adjusted in combustion chamber 12. In this context, high rotational speeds of internal combustion engine 10 may also be possible.

Figure 2:
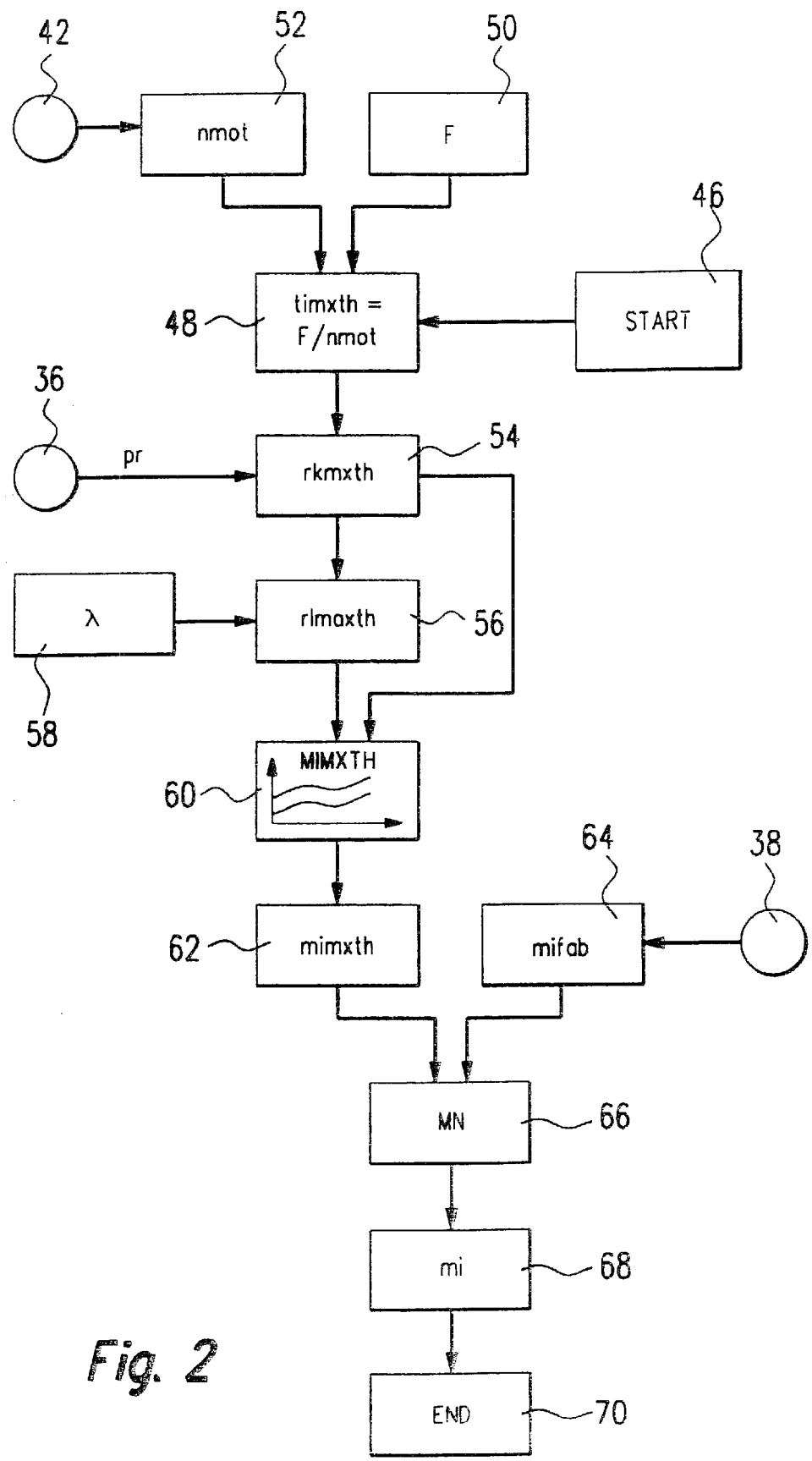
FIG. 2 illustrates a flow chart of a first example embodiment of a method for operating the internal combustion engine of FIG. 1.

The torque may be restricted by an appropriate control of servomotor 19 of throttle valve 17 by control and regulating device 34, thereby adjusting the air charge in combustion chamber 12 to maximum possible air charge rlmaxth determined in block 56 at which the air-fuel mixture corresponding to the desired lambda value is present in combustion chamber 12. The method illustrated in FIG. 2 is only activated when fuel pressure pr, which is ascertained by pressure sensor 36, is below a permissible range for the pressure in fuel collection line 20.

Figure 3:
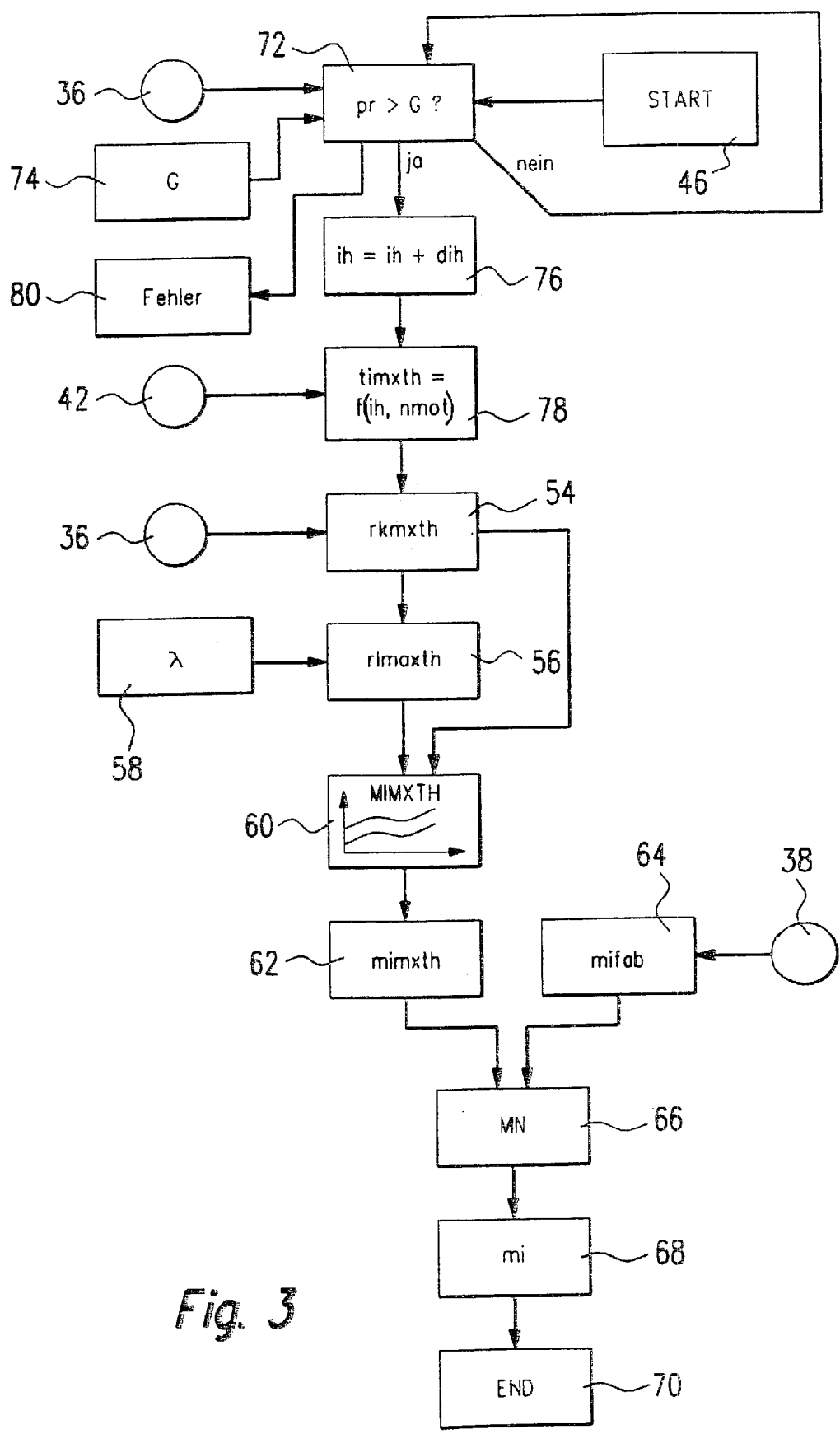
FIG. 3 illustrates a flow chart of a second example embodiment of a method for operating the internal combustion engine of FIG. 1.

FIG. 3 illustrates a second example embodiment for a method with which a reaction may be able to be made to a defective pressure pr in fuel collection line 20. Functional blocks that are functionally equivalent to the functional blocks in FIG. 2 have the same reference numerals in FIG. 3.

The method illustrated in FIG. 3 is intended for any case in which pressure pr in fuel collection line 20 is above a permissible range, e.g., due to a defective pressure control valve 28. To allow reliable opening of high pressure injection valve 18 also in this case, the holding current of high pressure injection valve 18 must be increased. However, this results in an increase in power loss in control and regulating device 34. This may be met by a decrease in the maximum possible injection time of high pressure injection valve 18 or a decrease in maximum possible torque of internal combustion engine 10. The details of this occurrence are as follows:

In block 72 pressure pr in fuel collection line 20 ascertained by pressure sensor 36 may be compared to a limiting value G stored in a read-only memory 74. If pressure pr exceeds limiting value G, holding current ih may be increased by an increment dih in block 76 and an error message 80 is emitted. In this manner, reliable opening of injection valve 18 may be ensured even in the case of increased fuel pressure pr. If pressure pr is within the permissible range, i.e., under limiting valve G, a return to the limiting value test in block 72 follows. The return may occur at a certain clock-pulse rate.

Subsequently, a maximum possible injection time timxth of high pressure injection valve 18 may be determined in a block 78 by consulting rotational speed nmot, which may be provided by speed sensor 42. In any case, this injection time may be shorter than the injection time at the normal fuel pressure.

Maximum injectable fuel quantity rkmxth may be again determined in a block 54 as a function of this maximum possible injection time timxth. The further sequence of the method illustrated in FIG. 3 corresponds to the method in FIG. 2. In any case, at the end of the method, a setpoint torque mi may result that corresponds to the smaller of the two torques mimxth and mifab, torque mimxth is a torque restricted on the basis of maximum allowable injection period timxth.

In this manner, it may be ensured that comfortable operation of internal combustion engine 10 without a rotational speed restriction may be possible even in the case of a pressure pr in fuel collection line 20 that is too high without the danger of damage to internal combustion engine 10. Combustion misses including accompanying torque losses are not a danger, although the total speed range may be available. Moreover, the driver of a motor vehicle equipped with internal combustion engine 10 may be made aware of the reduced maximum available torque by the error message in block 80 and may be, therefore, able to adapt his/her driving manner to the reduced available driving power.

Figure 4:
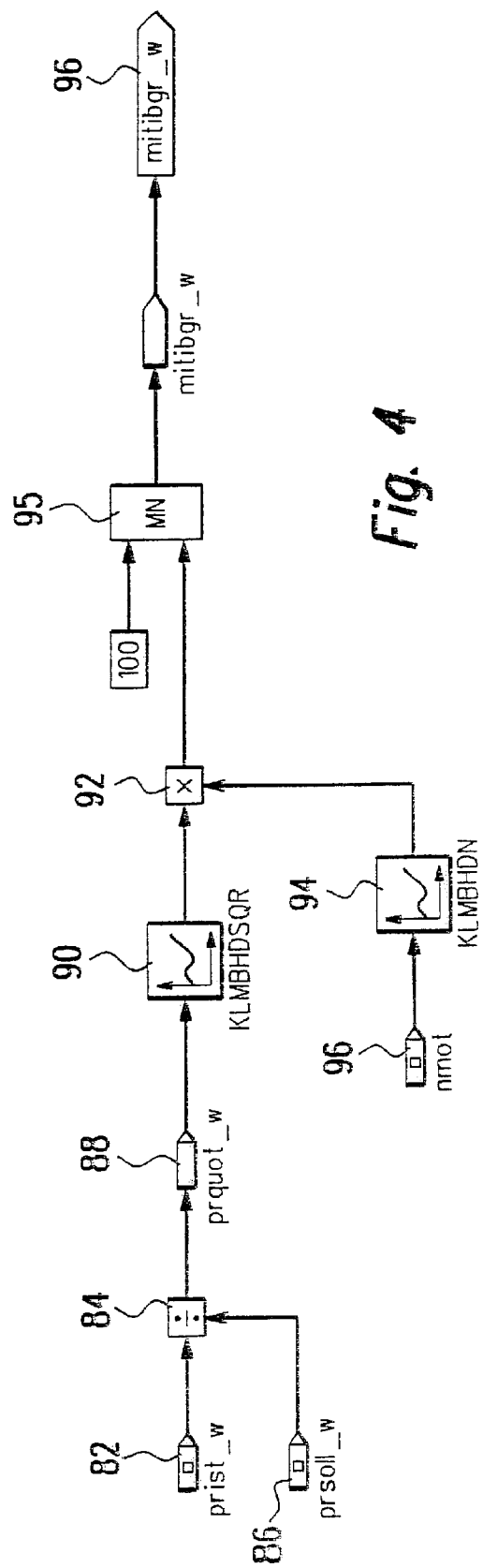
FIG. 4 illustrates a flow chart of a third example embodiment of a method for operating the internal combustion engine of FIG. 1.

FIG. 4 illustrates another possibility for adapting the maximum possible torque to the current situation in the internal combustion engine. The basis for the method illustrated in FIG. 4 is the consideration that when the fuel pressure is reduced, the injected fuel quantity decreases for the same injection period. In this context, it is assumed that the valve is configured such that at the maximum rotational speed and full load with maximum enrichment, the required amount is just able to be inserted into the combustion chamber of the internal combustion engine. Then the permitted torque at a decreased fuel pressure must be reduced by exactly the amount by which the injection quantity changes due to the decreased pressure. The percentage of change results from the root of the actual pressure to the setpoint pressure multiplied by 100%.

At a lower rotational speed, the injection time may be extended in the case of a decreased fuel pressure for which reason a reduced fuel pressure may not necessarily have to result in a torque reduction. The torque reduction may be correspondingly decreased again by a factor dependent on the rotational speed.

Specifically, this method functions as follows: An actual fuel pressure prist (block 82) may be provided by pressure sensor 36. In a block 84, it may be divided by a setpoint fuel pressure prsoll (block 86), and the resulting ratio prquot (block 88) may be fed into a characteristic curve KLMBHDSQR (block 90). This may be a root former which yields the above-mentioned percentage decrease in injection quantity or in the maximum torque.

On the output side of the characteristic curve in block 90, one receives a value that may be multiplied in block 92 by a factor that in turn may be output from a characteristic curve KLMBHDN (block 94) into which current rotational speed nmot may be fed. This result, that may be corrected with respect to rotational speed, may be entered into a minimum selection (block 95) and may be compared there to a maximum value 100%. The result is a torque mitibgr (block 96), which analogously to FIGS. 2 and 3 may be entered into the minimum selection (blocks 66 in those instances) with a driver's desired torque.

In this manner, a reduced fuel pressure as well as the rotational speed may also be taken into direct consideration for the formation of the maximum-possible torque.

What is claimed is:

1. A method for operating an internal combustion engine of a motor vehicle, comprising:
   supplying fuel under pressure via at least one injection valve;
   influencing a quantity of the fuel by an injection time; and
   determining a maximum allowable torque of the internal combustion engine that is dependent on an instantaneous fuel pressure.

2. The method according to claim 1, further comprising:
   acquiring the maximum allowable torque from a maximum air charge of a combustion chamber.

3. The method according to claim 2, further comprising:
   determining the maximum air charge on the basis of a maximum injectable fuel quantity.

4. The method according to claim 3, further comprising:
   determining the maximum injectable fuel quantity from an instantaneous rotational speed, a maximum possible injection time, and the instantaneous fuel pressure.

5. The method according to claim 3, further comprising:
   determining the maximum injectable fuel quantity from an instantaneous rotational speed, a holding current of the at least one injection valve, and the instantaneous fuel pressure.

6. The method according to claim 1, further comprising:
   detecting a deviation of the instantaneous fuel pressure from a setpoint range; and
   providing an error message if the deviation is detected.

7. The method according to claim 1, further comprising:
   reducing the maximum allowable torque at decreased fuel pressure with respect to a normal torque by an amount by which the quantity of the fuel changes as a result of the decreased fuel pressure.

8. The method according to claim 1, wherein the maximum allowable torque depends on the instantaneous rotational speed.

9. A computer program stored on a memory configured to be executed by a computer, the computer program comprising program code for operating an internal combustion engine in accordance with a method including:
   supplying fuel under pressure via at least one injection valve;
   influencing a quantity of the fuel by an injection time; and
   determining a maximum allowable torque of the internal combustion engine that is dependent on an instantaneous fuel pressure.

10. The computer program according to claim 9, wherein the memory is a flash memory.

11. A control or regulating device for operating an internal combustion engine of a motor vehicle, the device comprising:
    a first arrangement configured to supply fuel under pressure via at least one injection valve;
    a second arrangement configured to influence a quantity of the fuel by an injection time; and
    a third arrangement configured to determine a maximum allowable torque of the internal combustion engine that is dependent on an instantaneous fuel pressure.

\* \* \* \* \*